United States Patent
Li et al.

(10) Patent No.: US 9,720,800 B2
(45) Date of Patent: Aug. 1, 2017

(54) AUTO-GENERATING REPRESENTATIONAL STATE TRANSFER (REST) SERVICES FOR QUALITY ASSURANCE

(71) Applicant: International Business Machines Corporation, Armonk, NY (US)

(72) Inventors: Jeff J. Li, Parkland, FL (US); Wendi L. Nusbickel, Boca Raton, FL (US); Suraj R. Patel, Sambalpur (IN); Deepa R. Yarangatta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/838,674

(22) Filed: Aug. 28, 2015

(65) Prior Publication Data

US 2017/0060730 A1   Mar. 2, 2017

(51) Int. Cl.
*G06F 9/44* (2006.01)
*G06F 11/36* (2006.01)

(52) U.S. Cl.
CPC ...... *G06F 11/3616* (2013.01); *G06F 11/3672* (2013.01)

(58) Field of Classification Search
CPC ............ G06F 11/3616; G06F 11/3672; G06F 11/3688; G06F 11/3684; G06F 9/44589
USPC ........................ 717/124, 125, 126
See application file for complete search history.

(56) References Cited

U.S. PATENT DOCUMENTS

| | | |
|---|---|---|
| 8,145,726 B1 | 3/2012 | Roche et al. |
| 8,739,126 B2 * | 5/2014 | Glaser ................. G06F 11/3664 709/219 |
| 2009/0006897 A1 | 1/2009 | Sarsfield |
| 2012/0174075 A1 | 7/2012 | Carteri et al. |
| 2013/0055028 A1 | 2/2013 | Patil et al. |
| 2013/0185056 A1 * | 7/2013 | Ingram ............... G06F 11/3684 704/9 |
| 2014/0033170 A1 | 1/2014 | Nimashakavi et al. |
| 2014/0075242 A1 | 3/2014 | Dolinina et al. |

FOREIGN PATENT DOCUMENTS

| | | |
|---|---|---|
| EP | 1674991 | 6/2006 |
| WO | 03005221 | 1/2003 |
| WO | 2004021220 | 3/2004 |

OTHER PUBLICATIONS

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

* cited by examiner

*Primary Examiner* — Anna Deng
(74) *Attorney, Agent, or Firm* — Janaki K. Davda; Konrad, Raynes, Davda & Victor LLP (57) ABSTRACT

Provided are techniques for auto-generating Representational State Transfer (REST) services for quality assurance. One or more test cases and artifacts are received for a project. A test Representational State Transfer (REST) service is generated for the project using the one or more test cases and the artifacts. The test REST service is deployed on an application server for use in testing features of a REST service client application.

12 Claims, 10 Drawing Sheets

```
@Path("XML")
public class TestRest {
        @GET
        @Produces(MediaType.APPLICATION_XML)
        @Path("/test/{testId}")
        public String getTC001(@PathParam(value = "testId") int testId) {
                // get the expected results from database based on the testId
                // return the result
        }
        @POST
        @Consumes(MediaType.APPLICATION_XML)
        @Produces(MediaType.APPLICATION_XML)
        @Path("/test/{testId}")
        public String postTC001(@PathParam(value = "testId") int testId,
                String payload) {
                // verify based on the expected input for the testId that
                // the payload is valid
                // get the expected results from database based on the testId
                // return the expected result
        }
}
```

```
web.xml:
    <security-constraint >
        <web-resource-collection >
            <web-resource-name>...</web-resource-name>
            <description>...</description>
            <url-pattern>/rest/XML/Test/TC001</url-pattern>
            <http-method>GET</http-method>
            <http-method>POST</http-method>
        </web-resource-collection>

<auth-constraint >
            <description>...</description>
            <role-name>admin</role-name>
        </auth-constraint>
    </security-constraint>

<login-config>
        <auth-method>BASIC</auth-method>
        <realm-name>test</realm-name>
    </login-config> server.xml:
    <featureManager>
        <feature>...</feature>
    </featureManager>

<basicRegistry id="basic" realm="WebRealm">
        <user name="user1" password="user1pwd" />
        <user name="user2" password="user2pwd" />
    </basicRegistry>

<application type="war" id="RESTProject" name="RESTProject"
location="${server.config.dir}/apps/RESTProject.war">
        <application-bnd>
            <security-role name="admin">
                <user name="user1" />
                <user name="user2" />
            </security-role>
        </application-bnd>
    </application>
```

AUTO-GENERATING REPRESENTATIONAL STATE TRANSFER (REST) SERVICES FOR QUALITY ASSURANCE

FIELD

Embodiments of the invention relate to auto-generating Representational State Transfer (REST) services for quality assurance.

BACKGROUND

Representational State Transfer (REST) may be described as guidelines for creating web services. The REST service client application may be used to invoke Hypertext Transfer Protocol (HTTP)-based REST web services. To test REST service client applications, Quality Assurance (QA) engineers (or administrators) often need to rely on the real REST services provided by third party vendors. As an example, if a QA engineer needs to test a marketing application that invokes a particular vendor's marketing cloud services, the QA engineer needs to configure the application to be tested with the connections and services provided by the particular vendor. An Application Programming Interface (API) provides access to a software component by defining its operations, inputs, outputs, and underlying types. In the case of the REST step in the Extensible Markup Language (XML) stage, the QA engineer also needs to create and implement web services using Java® API for RESTful Web Services (JAX-RS) and then deploy those services on the application servers to perform the basic feature validations. (Java is a registered trademark of Oracle Corporation in the United States and/or other countries.)

It is often not suitable to create a large number of test cases. The QA engineer has to implement many web services on the application server, which is not an easy task and which is also very time-consuming.

There are many HTTP, HTTP Secure (HTTPS), Secure Sockets Layer (SSL), and authentication mechanisms that need to be tested. Often, average users do not have the skill sets to set up those security mechanisms without going through a long learning curve.

Relying on the third party services to test REST service client applications is not suitable for regression and performance tests. Typically, the regression tests are run several times per week to check code quality. The cost of invoking those third party services is based on the number of messages and sometime payload size. Relying on the third party services to test REST service client applications is also not suitable for the performance tests because the performance of the REST service client applications in those cases is largely dependent upon the internet connection, network traffic, and also how fast the third party services respond.

SUMMARY

Provided is a method for auto-generating Representational State Transfer (REST) services for quality assurance. The method comprises receiving one or more test cases and artifacts for a project; generating a test Representational State Transfer (REST) service for the project using the one or more test cases and the artifacts; and deploying the test REST service on an application server for use in testing features of a REST service client application.

Provided is a computer program product for auto-generating Representational State Transfer (REST) services for quality assurance. The computer program product comprising a computer readable storage medium having program code embodied therewith, the program code executable by at least one processor to perform receiving one or more test cases and artifacts for a project; generating a test Representational State Transfer (REST) service for the project using the one or more test cases and the artifacts; and deploying the test REST service on an application server for use in testing features of a REST service client application.

Provided is a computer system for auto-generating Representational State Transfer (REST) services for quality assurance. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: receiving one or more test cases and artifacts for a project; generating a test Representational State Transfer (REST) service for the project using the one or more test cases and the artifacts; and deploying the test REST service on an application server for use in testing features of a REST service client application.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
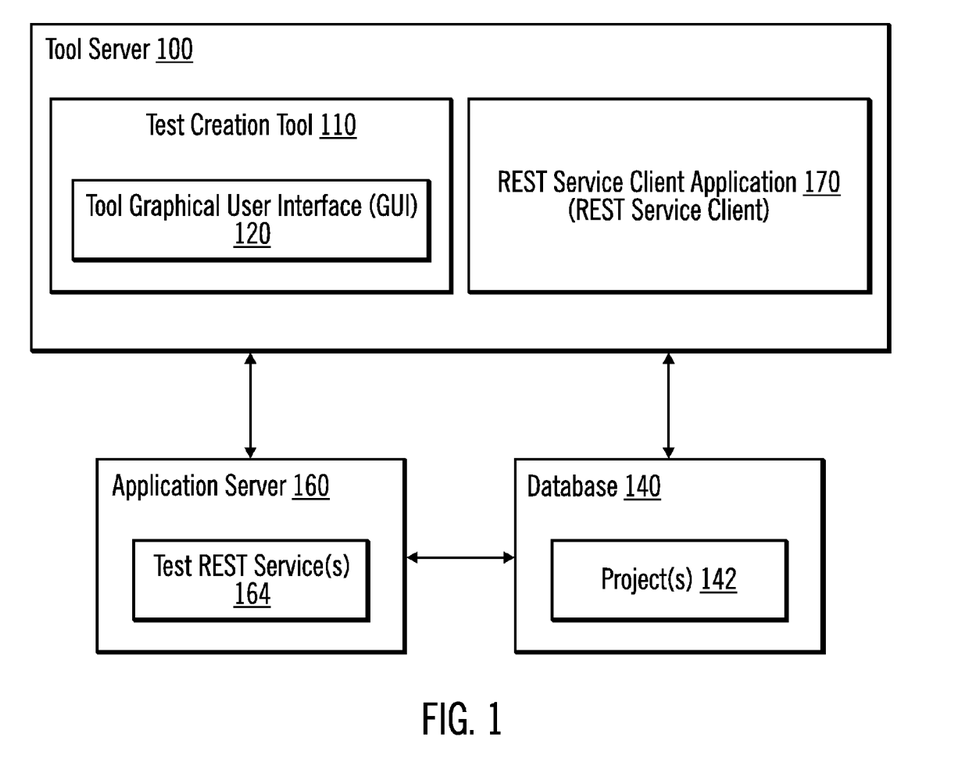
FIG. 1 illustrates, in a block diagram, a computing environment in accordance with certain embodiments.

FIG. 1 illustrates, in a block diagram, a computing environment in accordance with certain embodiments. A tool server 100 and an application server 160 are coupled to each other and to a database 140. The database 140 stores one or more test projects 142. The application server 160 includes one or more test REST services 164. The tool server 100 includes a test creation tool 110, which provides a tool Graphical User Interface (GUI) 120 to create test projects and input test cases. The tool server 100 also includes a REST service client application 170 (REST service client), which is the application which needs to be verified. The test creation tool 110 and the REST service client application 170 can be hosted on different machines (e.g., the REST service client application 170 may be hosted on a REST client machine).

In certain embodiments, when QA engineers want to test a REST service client application on a REST client machine, they start the test creation tool 110 to specify the test cases. The test cases may include testing input data, expected output data, and security settings. The test creation tool 110 converts the test cases into deployable services, which may be installed on the application server 160 (or any application server specified by the QA engineers).

In other embodiments, when QA engineers want to test a REST service client application using a service provided by a third party, they start the test creation tool 110 to capture the request and response from HTTP wire protocols for the service provided by the third party, and then the test creation tool 110 generates a test REST service to simulate the real service provided by the third party. After the test REST service is created, the QA engineers may test the REST service client application using the test service web application, rather than the real service.

The test creation tool 110 automatically generates test REST services (also referred to as "test service web applications") to test REST service client applications, such as an enterprise application, a cloud application or an Extract, Transform and Load (ETL) application that invokes REST services. In particular, the test creation tool 110 creates a test REST service, which is used to test a REST service client application, that is simple and self-contained. The test creation tool 110 may provide test REST services that are different from the normal services deployed on an application server as the test REST services are intended to test the basic features of REST service client applications, without implementing the complicated business logic in the application server 160. The test creation tool 110 provides and deploys bare-bone services for testing REST service client applications. Such characteristics are suitable for code generation and auto deployment.

The test creation tool 110 does not rely on regression and performance tests based on the services provided by the third party vendors. If such services are needed for the tests, the test creation tool 110 creates services to simulate what are provided by the third party vendors.

The test creation tool 110 automatically generates test REST services from the QA perspective of specifying the input data and the expected testing results.

The test creation tool 110 defines positive and negative test cases, generates test REST services automatically from the positive and negative test cases and from third party REST services, and auto-deploys and auto-configures the test REST services on the application servers for testing any REST service client application.

The test creation tool 110 is capable of auto-generating a large number of services and is suitable to create a large number of both positive and negative test cases. The test creation tool 110 auto-generates test REST services to simulate the services provided by the third party vendors. The test REST services are suitable for daily regression tests. The test REST services are also suitable for performance tests since those auto generated services may be deployed in a controlled environment.

With embodiments, the test REST services may be deployed on various application servers so that the REST service client application may be tested against various application servers.

The test creation tool 110 allows for setup of security mechanisms automatically for the generated test REST services based on the user's selections. With embodiments, users do not need to know the details of how to configure the application server.

Figure 2:
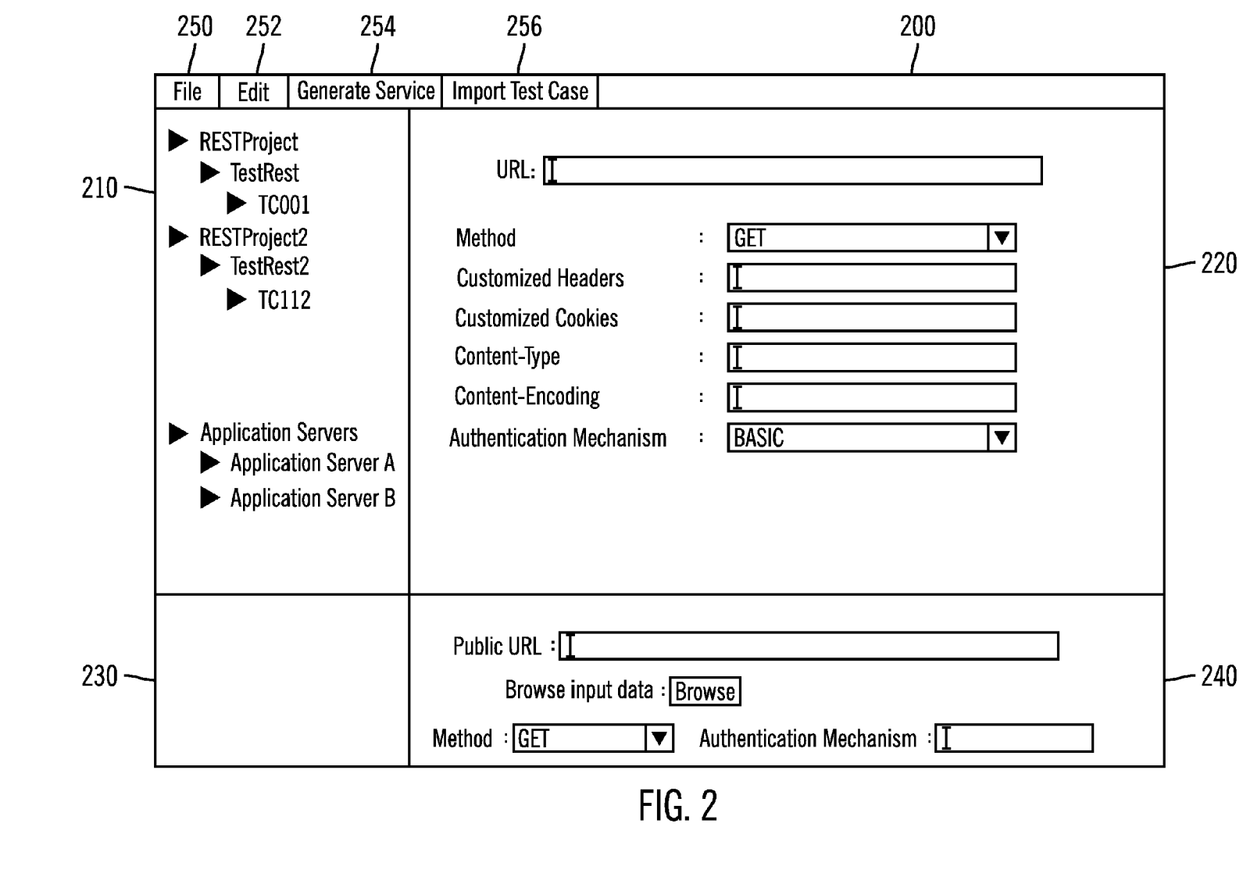
FIG. 2 illustrates a Graphical User Interface (GUI) screen design to generate test REST services in accordance with certain embodiments.

FIG. 2 illustrates a GUI screen 200 to generate test REST services in accordance with certain embodiments. The GUI screen 200 includes panes 210, 220, 230, and 240. The GUI screen 200 includes menus: File menu 250, Edit menu 252, Generate Service menu 254, and Import Test Case menu 256.

Using the GUI screen 200, a user creates a project from a File→New Project menu using the File menu 250. The new project is created to capture the test cases that the user wants to create for testing a REST service client application. A test REST service (to test the REST service client application) is generated from the project and deployed at a selected application server when the artifacts for the project and test cases are specified. In certain embodiments, the artifacts include security authentication mechanisms (e.g., user passwords and user identifiers) and user roles. The user may test the various features of the REST service client application by configuring the REST service client application to invoke various test REST services deployed on the selected application server. In screen 200, the user specifies the following at the project level:

Does the project require SSL? Where are the SSL trust store and key store for one way or two way SSL security validations?

Which authentication mechanisms does the project use for test REST services (e.g., HTTP basic authentication protocol, digest authentication protocol, NT LAN Manager (NTLM) authentication protocol, Simple and Protected GSSAPI Negotiation Mechanism (SPNEGO) authentication protocol, and Kerberos authentication protocol)? (Note, Generic Security Service Application Program Interface is GSSAPI).

Who are the users and what are the roles that the project uses for test REST services? A user may be assigned with multiple roles.

When the user selects the project, the properties of the project are shown in pane 230.

The user may categorize the test cases if needed (e.g., all XML related test REST services are grouped in one category, JavaScript® Object Notation (JSON) related test REST services are grouped in another category etc.). (JavaScript is a registered trademark of Oracle Corporation in the United States and/or other countries.)

The user may create and modify test cases. A test case may be created in with three approaches:

1. In pane 220, the user specifies: the Uniform Resource Locator (URL) of the test REST service, a method, customized headers, customized cookies, a content type, a content encoding, and an authentication mechanism for the test REST service.

> The text box in pane 220 allows user to enter any URL based on which the service will be generated, such as http: and continuing with //hostname:9080/rest/XML/test/TC001.
>
> Also, the user may select the authentication mechanism that is to be applied to the service. In certain embodiments, when the user selects an authentication mechanism, a role field is enabled, in which the role may be chosen from a drop down list, and the users having that role are able to access the test REST service generated from the test case.

2. In pane 240, the user may capture the details of an existing REST service from a third party service provider, and the test creation system 110 automatically creates a test case to simulate the existing REST service. The user specifies the URL, a method, and an authentication mechanism for the existing REST service. When the existing REST service is invoked, the test creation system 110 captures the request and response for the existing REST service. By analyzing the request and response, the test creation system 110 automatically creates a test case to simulate the invoked existing REST service.

3. The user may also define the test cases using a spreadsheet and then import the spreadsheet to create the test cases. A spreadsheet template may be downloaded from the test creation system 110. The user may fill the template with the test cases. Using the Import Test case menu 256, the user may browse and select a spreadsheet. The test cases defined in the spreadsheet are imported, and the project is refreshed with new test cases.

Once the test cases are created, the user may click on the Generate Service menu 254 to select an application server, generate the test REST service for the project, and deploy the web application on the selected application server. The user may add and configure several application servers in the project so that the test REST services may be deployed and duplicated on various application servers for quality assurance.

Figure 3:
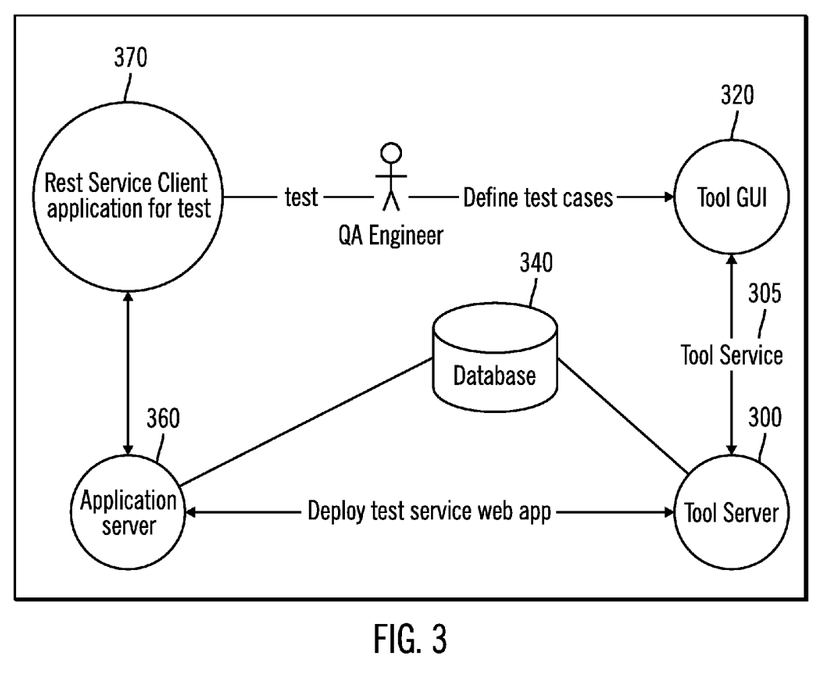
FIG. 3 illustrates an example of creating a test REST service to test a REST service client application in accordance with certain embodiments.

FIG. 3 illustrates an example of creating a test REST service to test a REST service client application in accordance with certain embodiments. In FIG. 3, also illustrates how users can use the test REST services generated from the test cases to test the REST service client application.

In FIG. 3, QA engineers create test cases using a tool GUI 320, which may be a web GUI. The tool GUI 320 collects project information, including the test cases and commands from users, and sends the project information to a tool server 300 through a tool service interface 305. The tool server 300 saves the project information and the related artifacts to a database 340. The tool server 300 also generates (e.g., using a test creation tool) the test REST service based on the project information stored in the database 340. The tool server 300 deploys the test REST service to the application server 360. The QA engineers tests the various features of a REST service client application 370 using the test REST services deployed on the application server 360.

Figure 4:
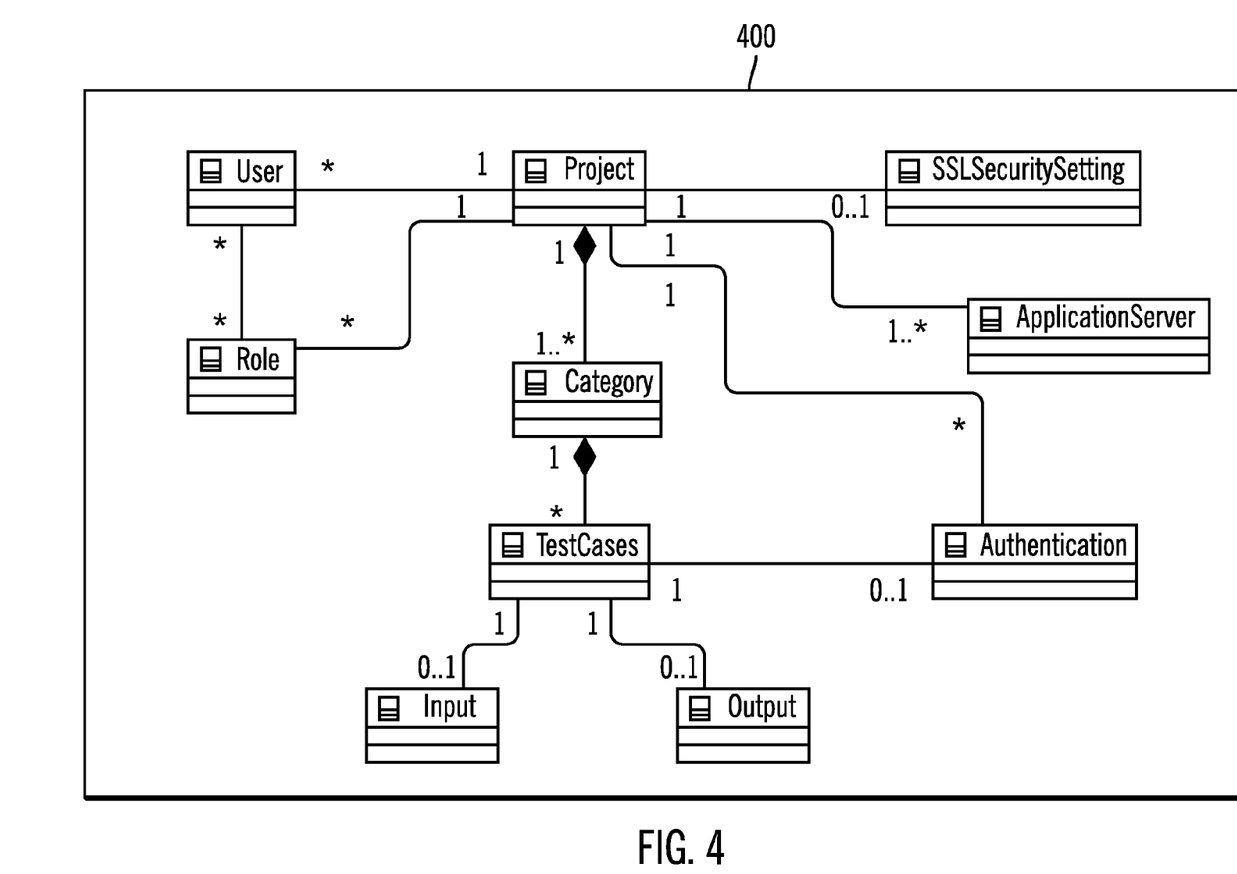
FIG. 4 illustrates elements for building a physical model of a database used by a test creation tool in accordance with certain embodiments.

FIG. 4 illustrates elements 400 for building a physical model of a database used by the test creation tool in accordance with certain embodiments. The database is used to store, for example, project information, test cases, and the artifacts related to security and authentications.

The following illustrates a technique for generating JAX-RS server Java® code based on a test case with the URL starting with http:// and continuing with //hostname:9080/rest/XML/test/TC001:

> The test creation tool 110 first checks if the URL is http or https. Based on the http/https information, the test creation tool 110 updates the security info of the server configuration file when the project is binding to a selected application server.
>
> The test creation tool 110 checks the first word of the URL after host:port (e.g., "hostname:9080") and treats this first word of the URL (e.g., "rest") as a root context. The test creation tool 110 modifies the web.xml. The web.xml may be described as a file that contains configurable parameters used by the application server at startup. This web.xml file is created for the web project when a user defines the context, authentication related tags, etc. In certain embodiments, the test creation tool 110 assumes that the test cases within a project have the same first word.
>
> The second word of the URL corresponds to @Path("/XML") at the class level.
>
> In the URL, the third word through the last word correspond to @Path at the method level. Some words may be treated as a @PathParam variable in the method, such as test id. The http method chosen and the last word are used to generate the method name.
>
> The test creation tool 110 uses the category name for the test case as the Java class name.

Figure 5:
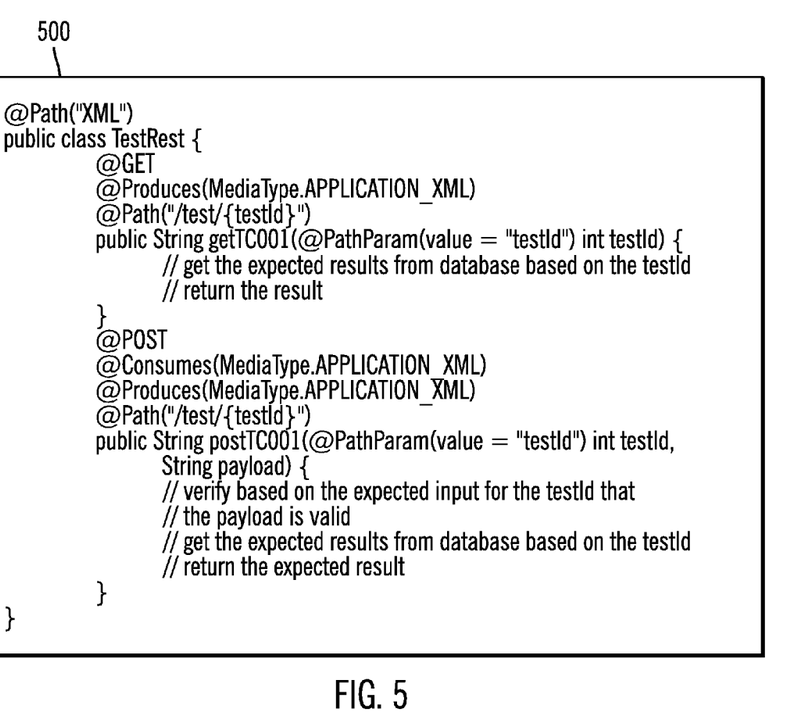
FIG. 5 illustrates example pseuodocode for GET and PUT methods in accordance with certain embodiments.

FIG. 5 illustrates example pseuodocode 500 for GET and PUT methods in accordance with certain embodiments. In particular, FIG. 5 illustrates example pseuodocode 500 for GET and PUT methods of the resource identified by the URL starting with http: and continuing with //hostname:9080/rest/XML/test/TC001.

Figure 6:
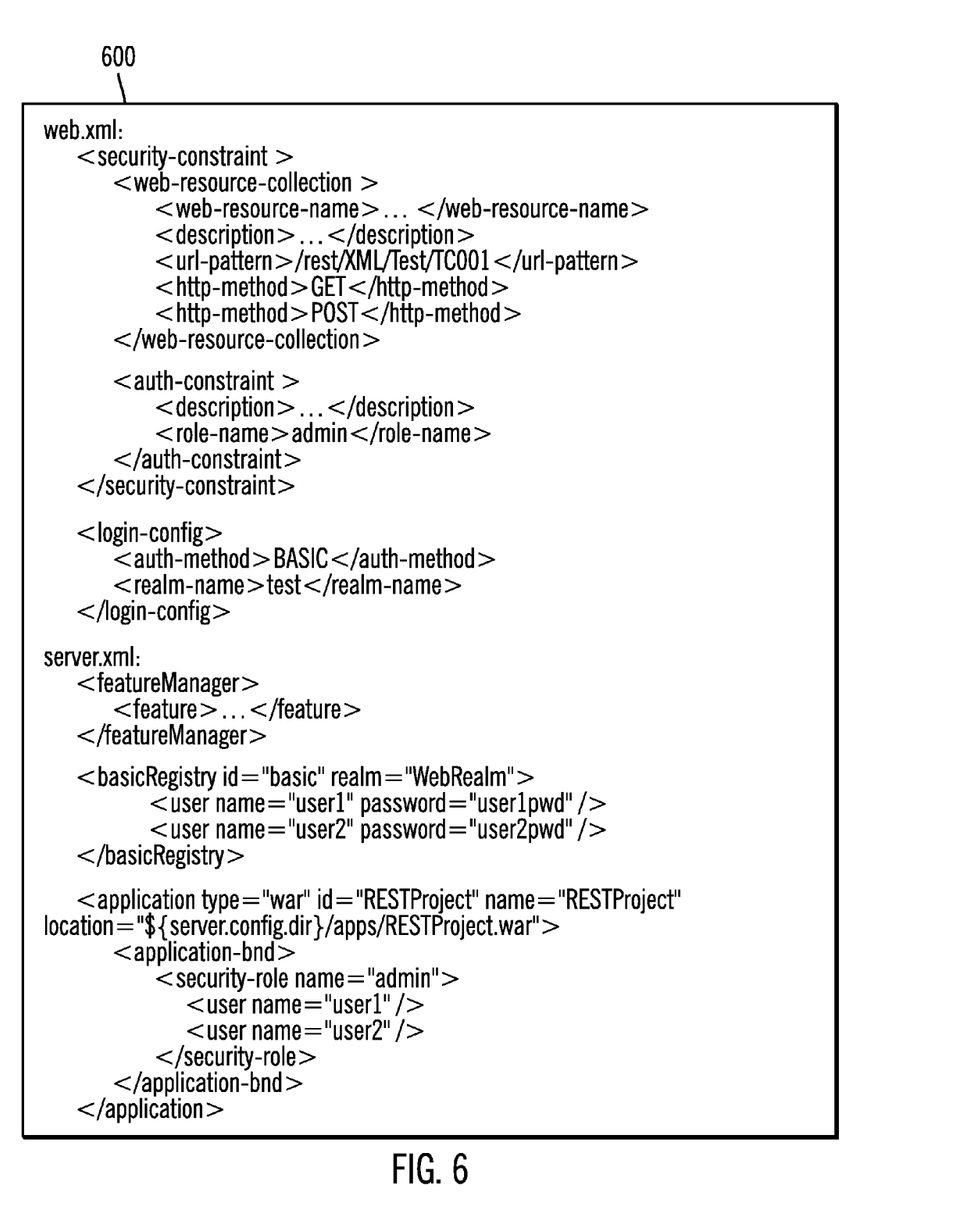
FIG. 6 illustrates pseudocode adding users, roles, and modifying a server configuration file to support basic authentication at the service generation phase in accordance with certain embodiments.

FIG. 6 illustrates pseudocode 600 adding users, roles, and modifying a server configuration file to support basic authentication at the service generation phase in accordance with certain embodiments.

Figure 7:
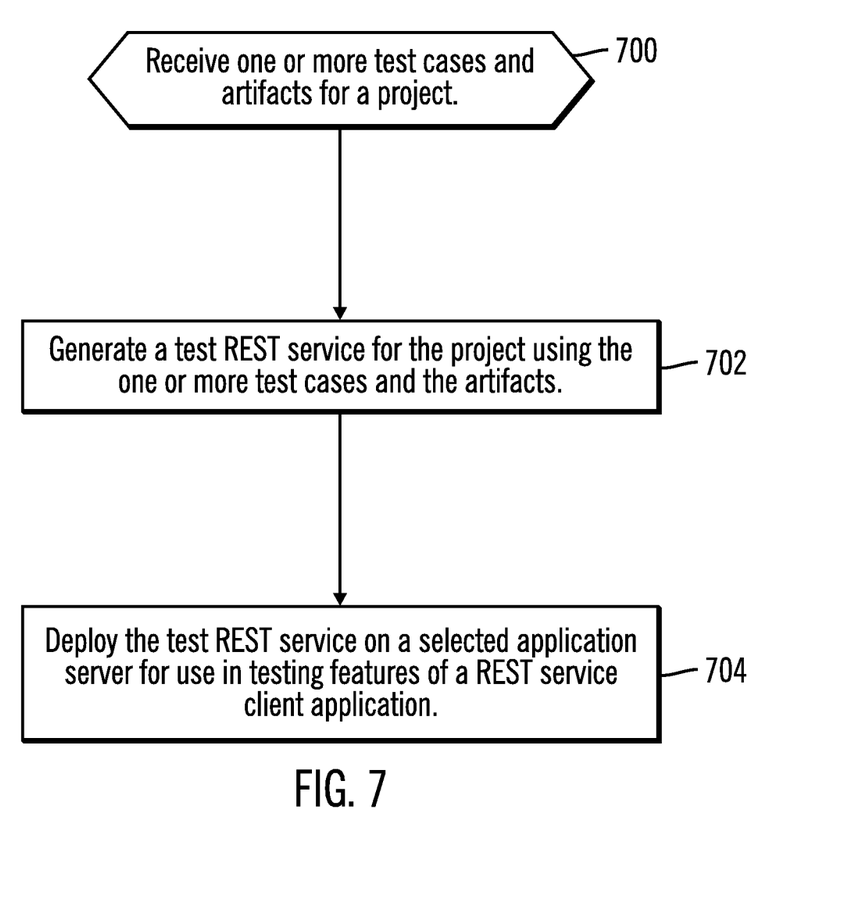
FIG. 7 illustrates, in a flow chart, operations for testing a REST service client application in accordance with certain embodiments.

FIG. 7 illustrates, in a flow chart, operations for testing a REST service client application in accordance with certain embodiments. Control begins at block 700 with the test creation tool 110 receiving one or more test cases and artifacts for a project. In block 702, the test creation tool 110 generates a test REST service for the project using the one or more test cases and the artifacts. In block 704, the test creation tool 110 deploys the test REST service on a selected application server for use in testing features of a Representational State Transfer (REST) service client application.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
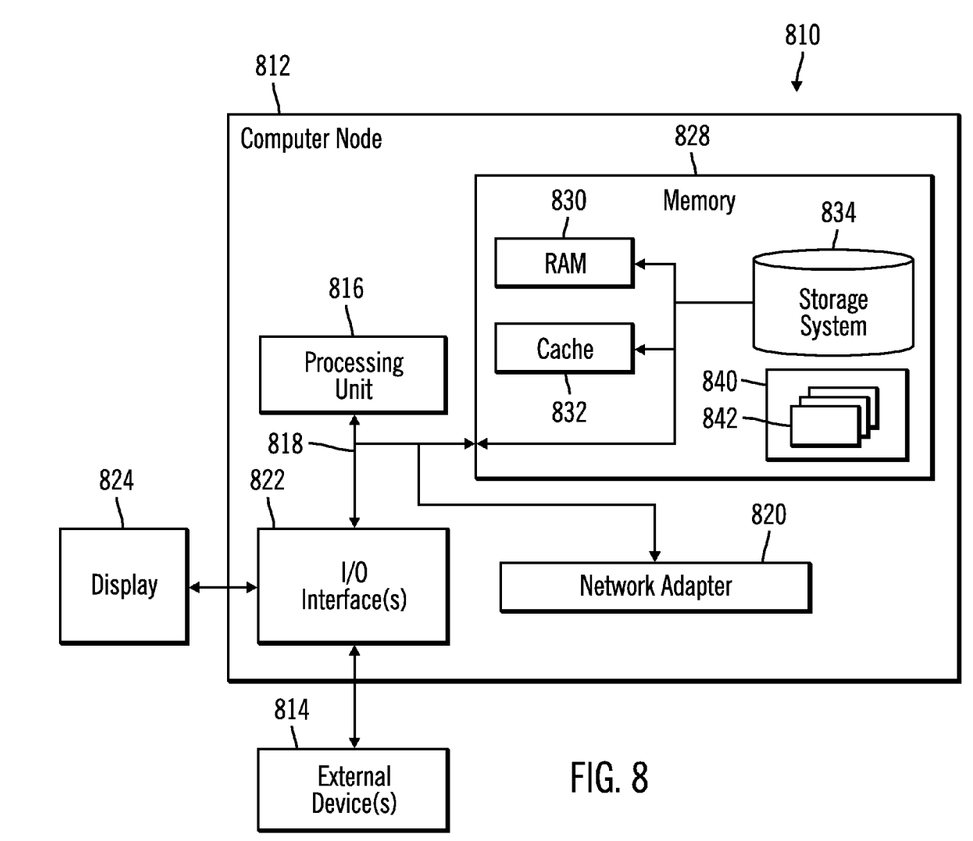
FIG. 8 illustrates a cloud computing node in accordance with certain embodiments.

Referring now to FIG. 8, a schematic of an example of a cloud computing node is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
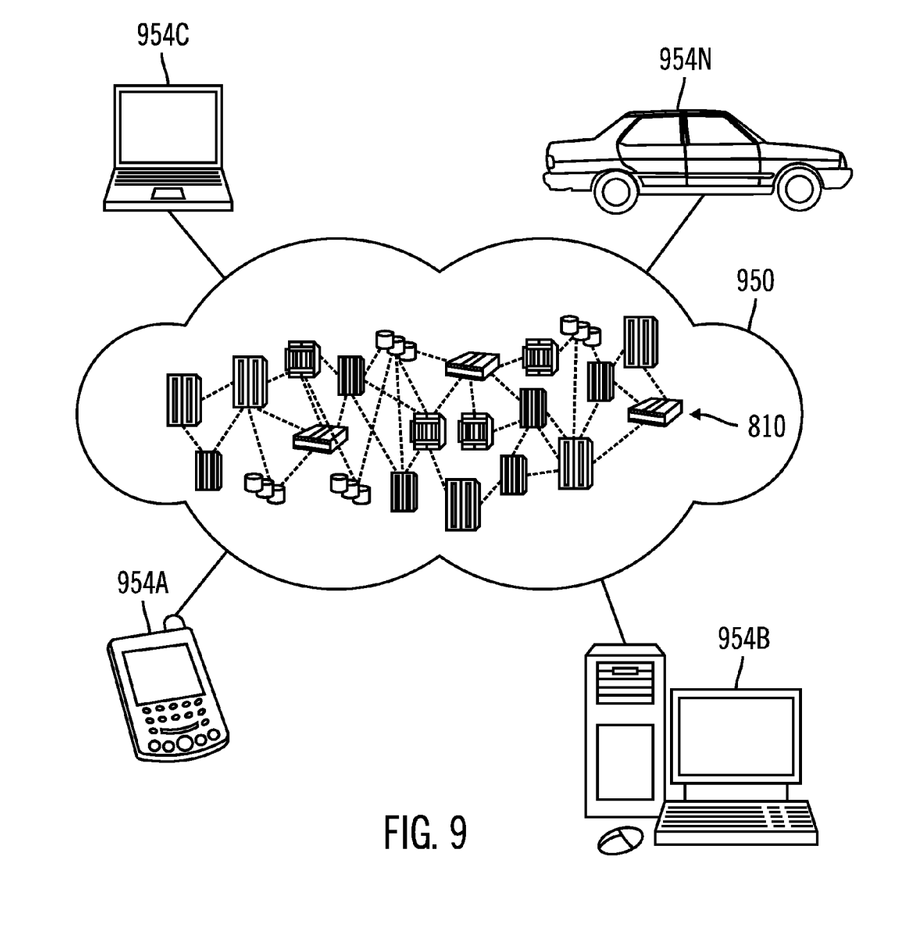
FIG. 9 illustrates a cloud computing environment in accordance with certain embodiments.

Referring now to FIG. 9, illustrative cloud computing environment 950 is depicted. As shown, cloud computing environment 950 comprises one or more cloud computing nodes 810 with which local computing devices used by cloud consumers, such as, for example, personal digital assistant (PDA) or cellular telephone 954A, desktop computer 954B, laptop computer 954C, and/or automobile computer system 954N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 810 and cloud computing environment 950 can communicate with any type of computerized device over any type of network and/or network addressable connection (e.g., using a web browser).

Figure 10:
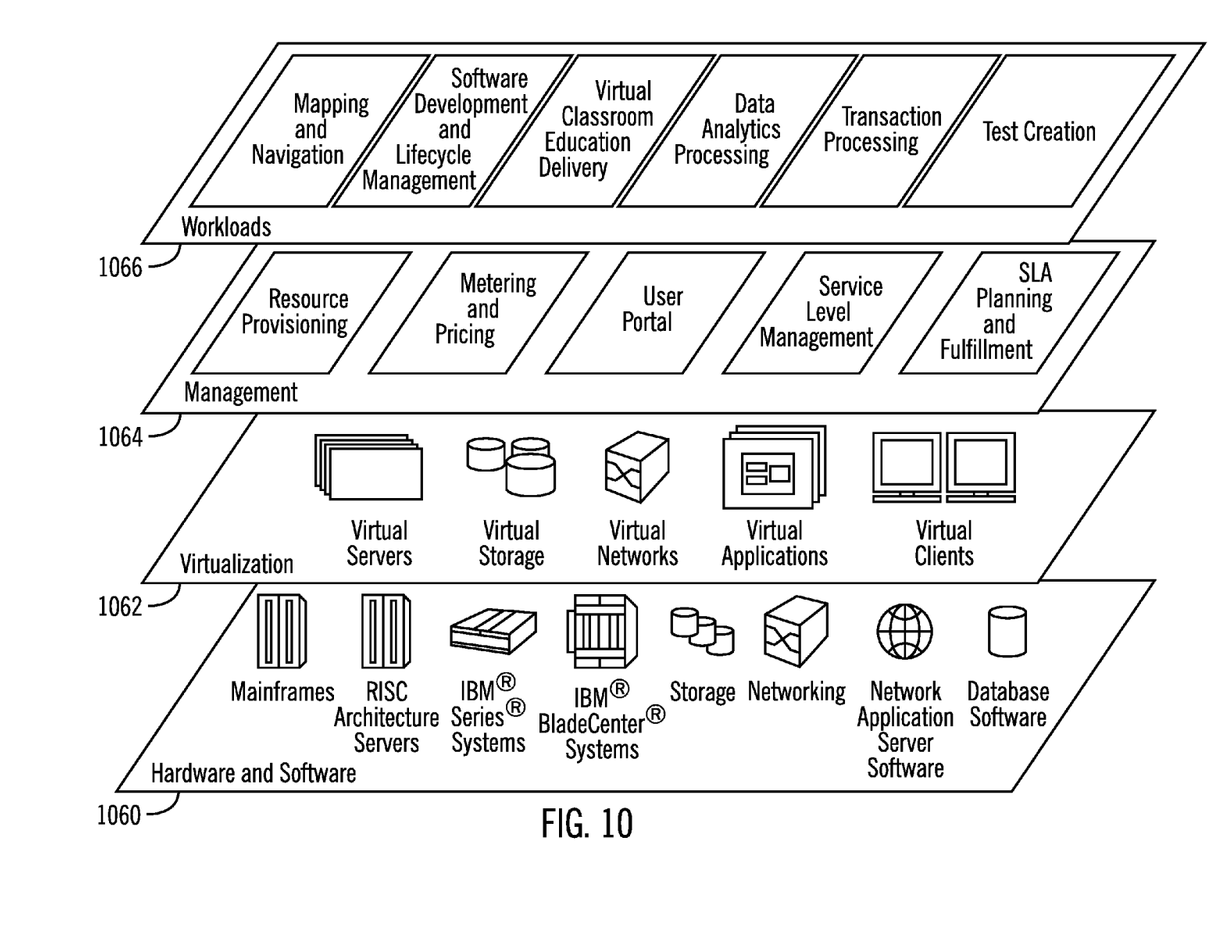
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and test creation.

Thus, in certain embodiments, software or a program, implementing test creation in accordance with embodiments described herein, is provided as a service in a cloud environment.

In certain embodiments, the tool server 100 and/or the application server 160 each has the architecture of computing node 810. In certain embodiments, the tool server 100 and/or the application server 160 may be part of a cloud environment. In certain alternative embodiments, the tool server 100 and/or the application server 160 may not be part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving, by a processor, a test case for a project, via a test creation tool of a tool server, that specifies a Uniform Resource Locator and an authentication mechanism for an existing Representational State Transfer (REST) service, wherein the existing REST service is provided by a third party vendor;
in response to the existing REST service being invoked, by the processor, capturing a request and response for the existing REST service;
converting, by the processor, the test case into a test Representational State Transfer (REST) service for the project using the request and response and using the authentication mechanism, wherein the test REST service simulates the existing REST service, and wherein the test REST service is used for at least one of regression testing and performance testing;
deploying and configuring, by the processor, the test REST service on different application servers; and
testing, by the processor, features of a REST service client application on the tool server with the test REST service deployed and configured on the different application servers.

2. The method of claim 1, further comprising:
creating multiple test cases, wherein the multiple test cases include positive test cases and negative test cases.

3. The method of claim 1, wherein the test case includes testing input data, expected output data, and security settings.

4. The method of claim 1, wherein a Software as a Service (SaaS) is configured to perform method operations.

5. A computer program product, the computer program product comprising a computer readable storage medium having program code embodied therewith, the program code executable by at least one processor to perform:
receiving a test case for a project, via a test creation tool of a tool server, that specifies a Uniform Resource Locator and an authentication mechanism for an existing Representational State Transfer (REST) service, wherein the existing REST service is provided by a third party vendor;
in response to the existing REST service being invoked, capturing a request and response for the existing REST service;
converting the test case into a test Representational State Transfer (REST) service for the project using the request and response and using the authentication mechanism, wherein the test REST service simulates the existing REST service, and wherein the test REST service is used for at least one of regression testing and performance testing;
deploying and configuring the test REST service on different application servers; and
testing features of a REST service client application on the tool server with the test REST service deployed and configured on the different application servers.

6. The computer program product of claim 5, wherein the program code is executable by the at least one processor to perform:
creating multiple test cases, wherein the multiple test cases include positive test cases and negative test cases.

7. The computer program product of claim 5, wherein the test case includes testing input data, expected output data, and security settings.

8. The computer program product of claim 5, wherein a Software as a Service (SaaS) is configured to perform computer program product operations.

9. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform:
receiving a test case for a project, via a test creation tool of a tool server, that specifies a Uniform Resource Locator and an authentication mechanism for an existing Representational State Transfer (REST) service, wherein the existing REST service is provided by a third party vendor;
in response to the existing REST service being invoked, capturing a request and response for the existing REST service;
converting the test case into a test Representational State Transfer (REST) service for the project using the request and response and using the authentication mechanism, wherein the test REST service simulates the existing REST service, an wherein the test REST service is used for at least one of regression testing and performance testing;
deploying and configuring the test REST service on different application servers; and
testing features of a REST service client application on the tool server with the test REST service deployed and configured on the different application servers.

10. The computer system of claim 9, wherein the operations further comprise:
creating multiple test cases, wherein the multiple test cases include positive test cases and negative test cases.

11. The computer system of claim 9, wherein the test case includes testing input data, expected output data, and security settings.

12. The computer system of claim 9, wherein a Software as a Service (SaaS) is configured to perform system operations.

* * * * *